United States Patent
Sharma et al.

(10) Patent No.: US 10,013,608 B2
(45) Date of Patent: Jul. 3, 2018

(54) METHOD AND SYSTEM FOR FACILITATING REAL TIME DETECTION OF LINEAR INFRASTRUCTURAL OBJECTS BY AERIAL IMAGERY

(71) Applicant: Tata Consultancy Services Limited, Mumbai (IN)

(72) Inventors: Hrishikesh Sharma, Bengaluru (IN); Adithya Vellaiappan, Bengaluru (IN); Balamuralidhar Purushothaman, Benagluru (IN)

(73) Assignee: Tata Consultancy Services Limited, Mumbai (IN)

( * ) Notice: Subject to any disclaimer, the term of this patent is extended or adjusted under 35 U.S.C. 154(b) by 117 days.

(21) Appl. No.: 15/211,654

(22) Filed: Jul. 15, 2016

(65) Prior Publication Data

US 2017/0068855 A1    Mar. 9, 2017

(30) Foreign Application Priority Data

Jul. 17, 2015    (IN) .......................... 2711/MUM/2015

(51) Int. Cl.
*H04N 7/18*    (2006.01)
*H04N 5/247*    (2006.01)
(Continued)

(52) U.S. Cl.
CPC ........ *G06K 9/00577* (2013.01); *B64C 39/024* (2013.01); *B64D 47/08* (2013.01);
(Continued)

(58) Field of Classification Search
CPC .......... H04N 5/247; H04N 7/18; H04N 7/181; H04N 7/183; H04N 7/188; H04N 5/33;
(Continued)

(56) References Cited

U.S. PATENT DOCUMENTS 7,840,066 B1 * 11/2010 Chen ...................... G06T 5/002
382/168
2013/0216089 A1    8/2013 Chen et al.
2014/0375770 A1    12/2014 Habel et al.

FOREIGN PATENT DOCUMENTS

CN    101625723    1/2010
CN    103810487    5/2014

* cited by examiner

*Primary Examiner* — Sherrie Hsia
(74) *Attorney, Agent, or Firm* — Finnegan, Henderson, Farabow, Garrett & Dunner LLP

(57) ABSTRACT

This disclosure relates generally to visual inspection systems, and more particularly to a method and system for facilitating real time detection of linear infrastructural objects in aerial imagery. In one embodiment, a background suppression technique is applied to one or more hardware processors to a HSV image. Further, a mean shift filtering technique is applied to the hardware processors to find a peak of a confidence map and then a gradient image generation is performed for a plurality of edges of the image. A seed point pair along a middle cut portion of a linear feature of the HSV image to identify one or more boundaries of the seed point pair is extracted and then a contour growing approach to detect the boundaries of the linear feature is initiated. Lastly, one or more false positives are removed by using a rigidity feature, the rigidity feature being equivalent to the total sum of gradient orientations.

10 Claims, 4 Drawing Sheets

(51) Int. Cl.
   *G06K 9/00*      (2006.01)
   *B64C 39/02*    (2006.01)
   *B64D 47/08*    (2006.01)
   *G06K 9/46*      (2006.01)

(52) U.S. Cl.
   CPC ....... *G06K 9/00637* (2013.01); *G06K 9/4619*
        (2013.01); *H04N 5/247* (2013.01); *B64C*
        *2201/127* (2013.01)

(58) Field of Classification Search
   CPC .. H04N 5/14; H04N 9/64; H04N 9/68; G06K
        9/00577; G06K 9/00637; G06K 9/4619;
        B64C 39/024; B64C 2201/127; B64D
        47/08; G06T 5/40
   USPC ....... 348/143–145, 254, 256, 649, 645, 671,
        348/672; 382/103, 168, 169
   See application file for complete search history.

 
(a) Sample Video Frame 1
(b) Frame Overlaid with Detected Power Lines
FIG. 3a
FIG. 3b

METHOD AND SYSTEM FOR FACILITATING REAL TIME DETECTION OF LINEAR INFRASTRUCTURAL OBJECTS BY AERIAL IMAGERY

PRIORITY CLAIM

This U.S. patent application claims priority under 35 U.S.C. § 119 to: India Application No. 2711/MUM/2015, filed on 17 Jul. 2015. The entire contents of the aforementioned application are incorporated herein by reference.

TECHNICAL FIELD

This disclosure relates generally to visual inspection systems, and more particularly to visual inspection systems for facilitating real time detection of linear infrastructural objects by aerial imaging.

BACKGROUND

Inspection, aerial photography and monitoring of state and growth of protective area under power lines and other similar structures are getting increasingly popular and widespread as conventional means are either expensive and risky (using piloted aircraft) or are extremely time consuming and do not capture all the necessary angles (inspection from ground). Power line monitoring involves visual inspection of towers and their high voltage insulators, as well as the cables.

Using piloted aircraft such as expensive helicopters also require a team of flying experts using certain dedicated equipment flying close to ground level at about 10-50 knots along the physical power route. Visual inspection of linear infrastructural objects is many times limited due to certain flying regulations and other public safety concerns. In the recent past, updated techniques (post considerable improvements in flight design techniques and development of lightweight cameras) for monitoring power lines using Unmanned Aerial Vehicles (UAVs) are emerging. Benefits of using UAVs are being realized particularly with respect to costs, noise, and risk mitigation, however many drawbacks still persist as a result of limited UAV functionality. Drawbacks include over reliance on operators to observe and carry out the mission where the UAV is just used as a flying camera.

Most UAV systems lack the ability to simultaneously stream real time, encrypted observation data to multiple ground stations. Although usage of UAVs for maintenance inspections, especially of long linear infrastructure is rapidly emerging as a popular option, the amount of video or image data acquired is typically huge, due to vastness of infrastructure. Thus, automated analysis of such images and videos are being increasingly sought. Such analysis necessitates detection of elongated foreground objects, commonly subjected as linear feature detection.

Conventional techniques so far for implementing automated linear feature detection in outdoor scenes have used Hough transform for clustering of lines. The Hough transform is a technique which can be used to isolate features of a particular shape within an image. Since Hough transform requires that the desired features be specified in some parametric form, the classical Hough transform is most commonly used for the detection of regular curves such as lines, circles, ellipses, etc. A generalized Hough transform can be employed in applications where a simple analytic description of a feature(s) is not possible.

However, the Hough transform has a computational complexity of the order of $O(n^3)$ which is considerably high. Additionally, the power lines range for long distances over different terrains vary and hence the background imagery can vary from trees and patches of greenery to different flat spaces along with other common objects such as homes and roads. Detection of long linear infrastructural objects is challenging but necessary.

A couple of conventional techniques use the process of canny edge detection as the core step and implementation of canny edge detection leads to higher computational complexity and this higher computational complexity is not suitable for near-real-time processing. Other prior techniques either tackle their problem of linear feature detection in medical imaging domain (where the background imagery is plain and simple and are not applicable for outdoor scene analysis directly) or are not robust enough to detect false positives.

In general, existing techniques have assumed the background imagery to be near-stochastic, and accordingly focused primarily at background modeling and subtraction. This generalist assumption simplifies the process design to a rudimentary level as in a realistic scenario, outdoor video background is not stochastic (i.e having a random probability distribution or pattern that may be analyzed statistically but may not be predicted precisely) and hence multiple ways of background suppression rather than (complete) subtraction needs to be evolved.

SUMMARY

Embodiments of the present disclosure present technological improvements as solutions to one or more of the above-mentioned technical problems recognized by the inventors in conventional systems. For example, in one embodiment, a computer implemented method for facilitating real time detection of at least one infrastructural object by aerial imaging is provided. The method comprises applying a background suppression technique, wherein a HSV image is first converted to a grey scale image and a binary image, implementing a mean shift filtering technique to find a peak of a confidence map by using a color histogram of the HSV image, performing a gradient image generation for a plurality of edges of the HSV image using a Sobel function, extracting a seed point pair along a middle cut portion of a linear feature of the HSV image to identify one or more boundaries of the seed point pair; and initiating a contour growing approach to detect the one or more boundaries of the linear feature.

In another embodiment, a computer implemented system for facilitating real time detection of at least one infrastructural object by aerial imaging is provided. The system comprises a memory for storing instructions, a hardware processor coupled to the memory, Wherein the hardware processor is configured by instructions to apply a background suppression technique, wherein a HSV image is first converted to a grey scale image and a binary image. The processor further implements a mean shift filtering technique to find a peak of a confidence map by using a color histogram of the HSV image, perform a gradient image generation for a plurality of edges of the HSV image using a Sobel function, extracts a seed point pair along a middle cut portion of a linear feature of the HSV image to identify one or more boundaries of the seed point pair; and initiate a contour rowing approach to detect one or more boundaries of the linear feature.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3a and FIG. 3b illustrate exemplary images depicting detection of linear features in sample frames, according to the embodiments as disclosed herein.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Throughout, the specification the terms "seed point pair growing" and "contour growing" are used interchangeably.

Figure 1:
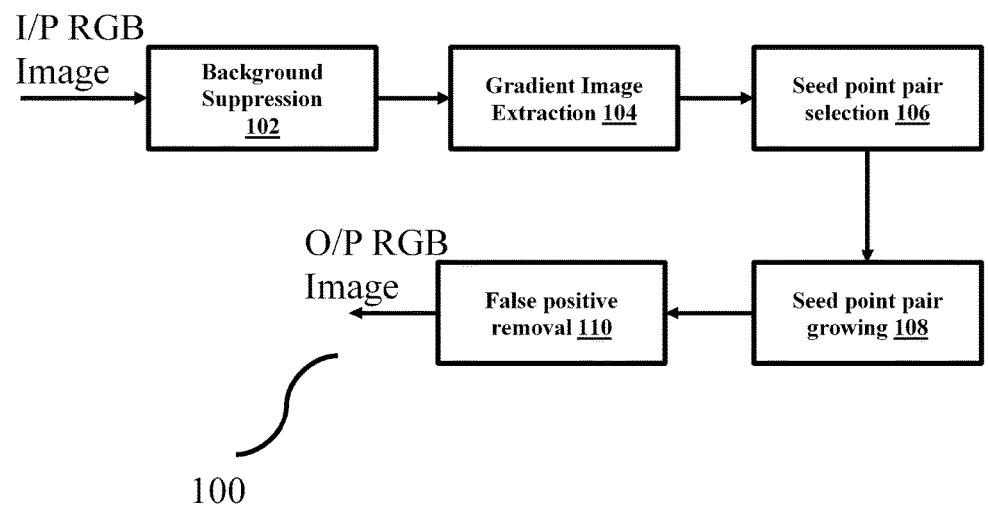
FIG. 1 illustrates a functional block diagram of an image processing system 100, according to the embodiments as disclosed herein.

FIG. 1 illustrates a functional block diagram of an image processing system 100, according to the embodiments as disclosed herein.

As depicted in FIG. 1, the image processing system 100 comprises of stages such as background suppression, image extraction, seed point pair selection, false positive removal, and a seed point pair growing stage. It is to be noted that the images or (frames) captured by a camera (not shown in Figure) are in Red, Green, Blue (RGB) format. The RGB color space is correlated to allow for a scant representation of the image data. Scantiness or sparseness is mandatorily required since any real time transmission of images/video to a ground tower over a bandwidth constrained link or network necessitates compression of data.

In an embodiment various long linear infrastructures, when imaged aerially exhibit certain characteristics that are similar such as:
  Objects such as railway lines being rigid metal-based structures are close to a straight thick line (with a small curvature in aerial image).
  During monitoring of infrastructures using a down facing, side facing or below looking camera, UAVs can fly at a height but in relative proximity to a power grid or an object to be monitored. Hence there is no occlusion/ obstruction over a plurality of linear image objects.
  The corresponding linear artifacts in the aerial image exhibit high pixel intensity, since they are typically constructed using metals/alloys which reflect brightly.
  High gradients are primarily found at least along the contours of the long linear infrastructure.

Using the above mentioned characteristics, a 3-Dimensional (3D) feature space is constructed to locate linear features, as required in maintenance inspections, with high fidelity. The 3 D feature space can include two popular sparse representation spaces in image processing such as Hue-Saturation-Value (HSV) color space and Hue-Saturation-Lightness for consideration. Hue is considered as the dominant color component at the location of interest while Saturation is considered as the color intensity (or purity) and Value translates to the luminance or simple brightness.

In an embodiment, the dominant background of the images among the power line images are the sky and greenery. Both sky and greenery have specific HSV values that do not interfere with the power-line values. Applying background suppression techniques by the image processing system 100 at block 102, the HSV image is first converted to a grey scale image and then a binary image using a suitable threshold. The color based suppression reduces greenery and sky, but some interference from roads and houses can be present at times. Certain erosion operators are used to remove such vestigial background. After assessing certain tabulated results, it can be observed clearly that background suppression technique applied at block 102 is able to significantly reduce background clutter.

The image processing system 100 goes through multiple (e.g. . . . 5) Stages of detection for linear structures, especially power lines in aerial images. In order to detect linear infrastructural features, a mean shift filtering technique is applied by the image processing system 100 to find the peak of a confidence map using the color histogram of the image, and gradient image generation is performed to retain all the linear infrastructural features. Further, based on the position of the camera, the medial strip is considered and seed point pairs for contour growing are selected based on parameters such as gradient magnitude and pixel value as features.

Additionally, detection of contours for infrastructural linear features in image space is performed using a contour growing approach and finally false positives are removed using a rigidity feature, as represented by the total sum of gradient orientations. A detailed step by step approach is as explained below:

Mean Shift Filtering:

Due to vastness and complexity of the background imagery, existing edge detection techniques show a number of edges in the background, along with those in the foreground. In order to reduce the predominant background clutter and then to simultaneously accentuate the foreground, a plurality of images must be filtered. Mean shift filtering is a data clustering process commonly used in computer vision and image processing. For each pixel of an image (having a spatial location and a particular color) the set of neighboring pixels (within a spatial radius and a defined color distance) is determined. For this set of neighbor pixels, the new spatial center (spatial mean) and the new color mean values are calculated. These calculated mean values serve as the new center for the next iteration of mean shift filtering. The mean shift filter procedure is iterated until the spatial and the color mean stops changing. At the end of the iteration, the final mean color will be assigned to the starting position of that iteration.

Gradient Vector Image Generation:

At block 104, gradient image extraction is performed. Gradient image extraction facilitates extracting richer information from images and helps obtain comparatively more discriminative power than standard histogram based methods. The image gradients are sparsely described in terms of magnitude and orientation. After the process of background suppression, the gradient magnitudes for a plurality of edges of the segmented images are estimated as a first feature, using a Sobel function. The Sobel function is predominantly used in image processing and computer vision, particularly within edge detection algorithms and creates an image which emphasizes edges and transitions of the captured image.

Context Based Potential Seed Point Selection:

The image processing system 100 detects a plurality of linear features by tracking a prominent boundary of such objects in the gradient image. Since the plurality of objects are linear, the boundary contour of such objects are open to an extent and these boundary contours occurs in a pair of approximately parallel lines. Due to a perspective projection in images via the (side facing) camera, the parallel lines are thickest near the middle of the frame.

In order to extract an open contour with two or more boundaries, a method for growing one or more boundaries are implemented. In an embodiment, a seed point pair is extracted and selected at block 106 along a prominent middle vertical cut portion, per instance of linear feature, and then first two features of the prominent middle vertical cut portion are used to identify the boundaries of the seed point pairs. Further, a construction of a first set of seed point pairs is performed via construction of a second set of candidate seed points. Consider that a set of gradient magnitudes of the pixels along medial vertical lines as $G_{w/2}$, and a set of values from HSV space as $V_{w=2}$, for a w×h-sized image. Every seed point which is a part of any pair can be represented by $s(g, v)$, where $g$ and $v$ are appropriate gradient and HSV value respectively. Conversely, let $g(s)$ and $v(s)$ represent the gradient and HSV value of a seed point. Also, let $L(s)$ represent pixel location of a seed point, and $v(l): l \in L$ be the value at a pixel location. First, the set of candidate seed points C is prepared by taking high gradient pixels on the medial vertical line as follows.

$$C = \left\{ \exists s(g, v) : \left\{ g(s) > \left( \text{mean}\left(G\frac{w}{2}\right) + \text{var}\left(G\frac{w}{2}\right) \right) \right\} \wedge \\ L(s) \in \left\{ \left(\frac{w}{2}, 0\right), \left(\frac{w}{2}, 1\right), \ldots, \left(\frac{w}{2}, (h-1)\right) \right\} \right\} \quad (1)$$

where mean(Σw/2) and var(Σw/2) are mean and variance of gradient magnitudes respectively. From this candidate set C, the set of paired seed points, S, is constructed as follows.

In case, the position of the camera is front facing, then the plurality of seed points pair are detected from the bottom horizontal line. For example, a video is captured as the visual band image data and a test site in the outskirts of a city is chosen. A fixed-wing mini-UAV is flown at a speed of around 35 km/hr and the positioning of the UAV is such that it can flow overhead to the power grid. This implies that the camera tilt is also front facing and therefore minimized the amount of occlusion among power lines.

Contour Growing Approach:

Once the seed points are selected at block 106, an iterative contour growing approach is initiated to detect the boundaries of linear features. The contour growing approach or method at block 108 is derived from non-maximum suppression method for thinning of boundaries detected by one or more Sobel operators. An image is scanned along the direction of the gradient from each seed point. The local maxima of a pixel (x;y) is estimated in the current neighborhood window including the orientation i.e 3 pixels {((y+0; x+1); (y1; x+1); (y−1; x+1)}, notionally represented by $\Sigma O_{0,1}$, $\Sigma O_{1,1}$ and $\Sigma O_{-1,1}$.

At this point, the number 1 represents the gradient direction and after comparison new seed points that are local maxima in both left direction and right direction of the three neighborhoods are located and are then simultaneously considered for growing the boundary in the next iteration. In case, a seed point pair is represented at a particular location as s s(x, y), location of the seed as L(s), (second) feature value of the seed as V(s), then:

$$s(x,y) \equiv \{L, V\}$$

Thereby, it is easy to conjure a bijective mapping and its inverse between at least one L-V pair (Location—feature value of the pair) which can be denoted as $L \leftrightarrow V$ and $V \leftrightarrow L$ respectively. If N(S) is considered as the next location of a boundary seed point that is computed in an iteration, then $$N(s) = \{V \leftrightarrow L\}[\max\{V(L(s) + GO_{0,1}), V(L(s) + GO_{1,1}), V(L(s) + GO_{-1,1})\}] \quad (3)$$

Rigidity Based Removal of False Positives:

This is the final stage in facilitating real time detection of linear infrastructural objects in aerial imagery as depicted at block 110 and removal of false positives using a rigidity feature is undertaken as represented by the total sum of gradient orientations. Overall, the embodiments herein enable to minimize the missed detections, or false negatives, since a minimum tracking of power lines just below the camera is assured in all frames. Additionally, the misclassification of random linear features as a power line segment is minimized since long linear stripes in image intensity is unique to power lines.

Figure 2A:
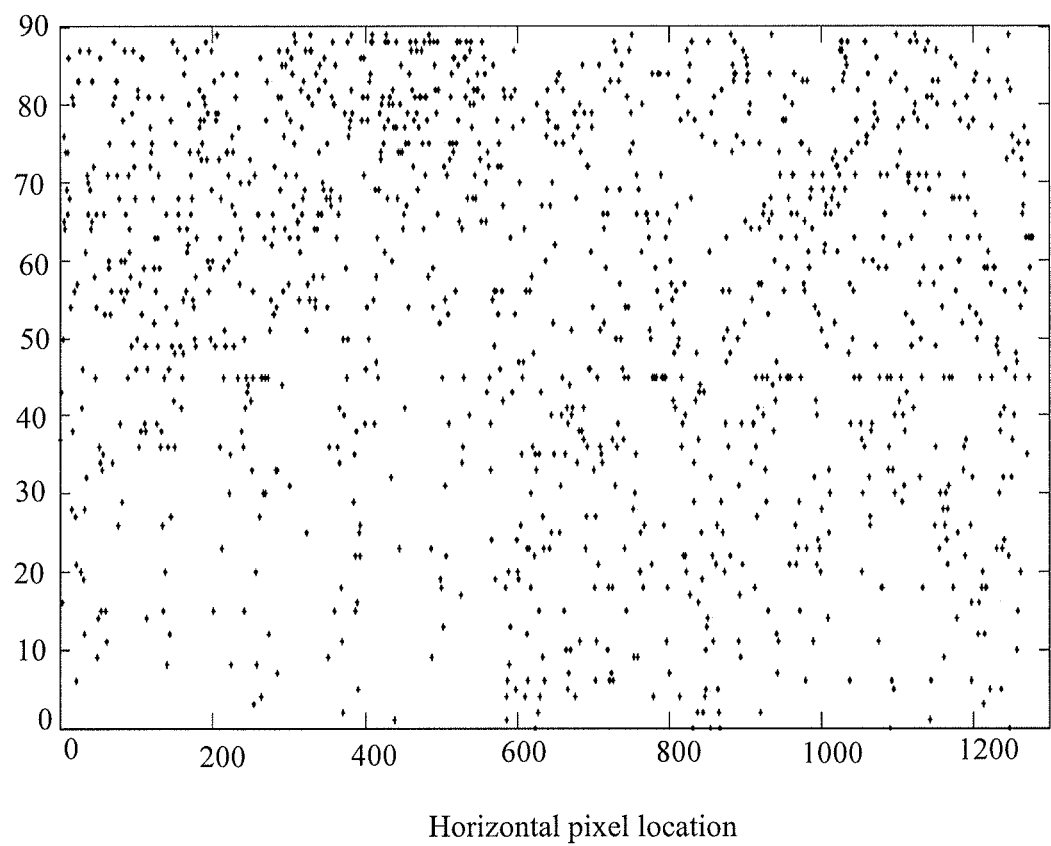
FIG. 2a and FIG. 2b illustrate exemplary images depicting rigidity distribution for true and false detection, according to the embodiments as disclosed herein.
Figure 2B:
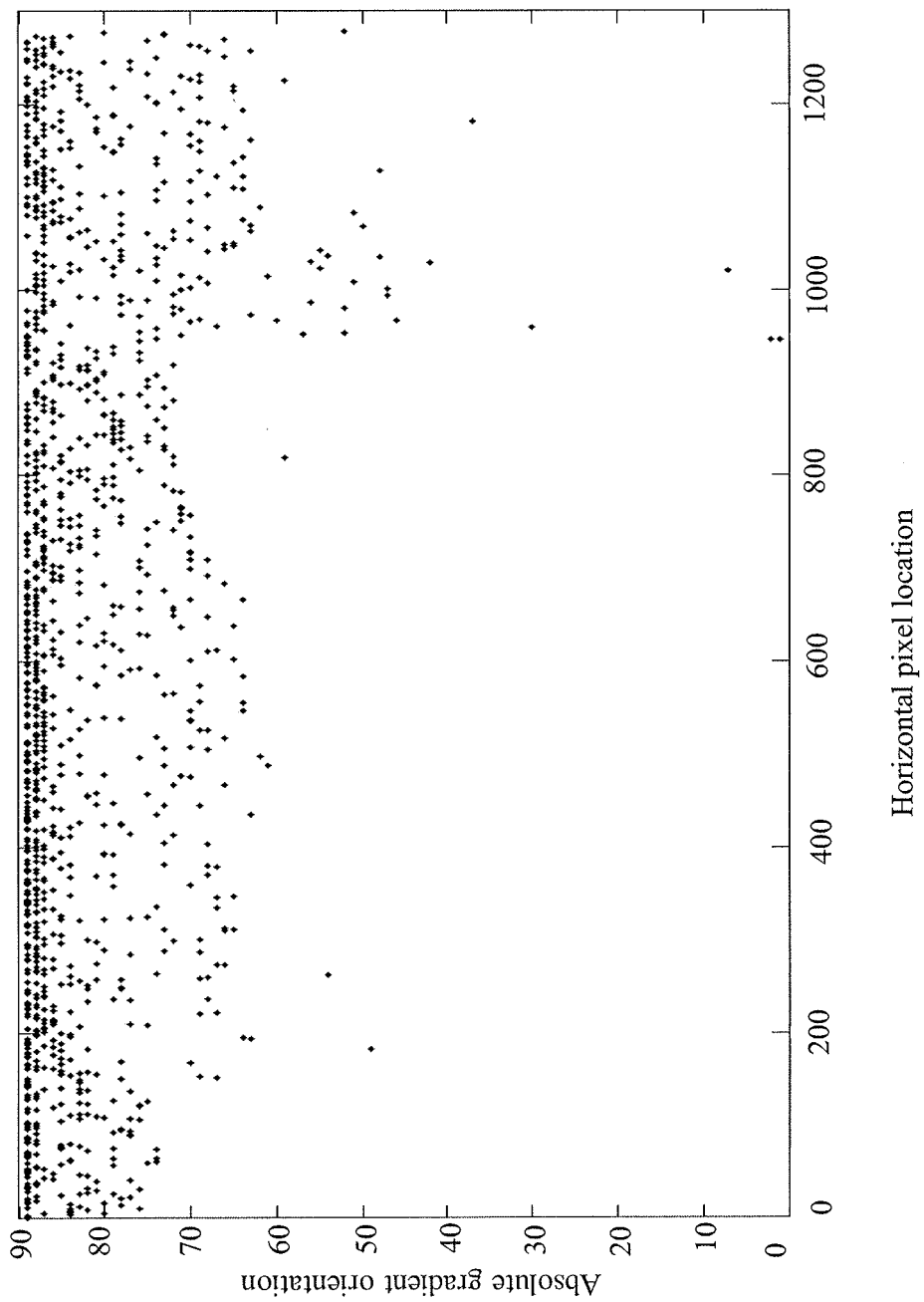

FIG. 2a and FIG. 2b illustrates exemplary images depicting rigidity distribution for true and false detection, according to the embodiments as disclosed herein. In essence, all linear infrastructure objects are thick metallic objects and hence possess a limited degree of elasticity. Due to high rigidity of the linear infrastructure objects, the curvature of the objects manifests itself as a slow gradual change in gradient orientation across a sequence of boundary pixels, thus limiting the pixels into a narrow band of orientation values. As a byproduct, the range of orientations is also limited and somewhat influenced by the position of the camera as well as the distance of the object from an optical center of the camera (as depicted in FIG. 2a).

Further, from another point of view most of the false positives occurring in the heterogeneous background exhibit a certain degree of randomness in gradient orientations. Unlike rigid infrastructures, such false positives do not possess a spatial correlation and banding of gradient orientations in a narrow band, but instead possess a point spread function (PSF). The point spread function (PSF) describes the response of an imaging system to a point source or point object. A more general term for the PSF is a system's impulse response, the PSF being the impulse response of a focused optical system. The PSF in many contexts can be assumed as the extended blob in an image that represents an unresolved object.

Since these false positives possess a spread out function, this observation can be used to weed out false positives in the final stage (fifth stage). It is to be noted that it is hard to parameterize band shapes and sizes, which in turn defines rigidity. This process of parameterizing is considered hard because mechanical bends (sags in power lines, slow turns in railway lines) can be purposefully introduced in the infrastructure, and the amount of such bends differ in various conditions.

However, in order to compensate for the dependency of band sizes of different camera poses and distances, a metric of total orientation sums to threshold is used to identify and remove false positives. The sum of all orientations along each of the grown boundary pair sequence is defined as the total orientation sum for that object. The threshold for the total sum is considered as 90% of the maximum of total gradient sums for all the boundary pairs identified after the fourth stage. This occurs because the maximum total sum for a true positive will be dominated by spatially correlated angles clustered around a mean, while the total sum for a false positive is expected to be a sum of random angles as per some spread function, thus having lesser mean value.

Several times, the usage of this feature is also capable of removing a linear feature whose boundary tracking strays away from the actual boundary during iterations till an advanced stage (up to almost complete tracking) is reached. This process occurs because once the boundary tracking is strayed from the actual boundary, the gradient orientation of the remaining part of the tracked boundary becomes random in nature and hence the total sum becomes lesser than the expected threshold in most of the cases.

FIG. 3a and FIG. 3b illustrate exemplary images depicting detection of linear features in sample frames, according to the embodiments as disclosed herein. In an embodiment, the image processing system 100 can also be enabled for a semi-automated processing of fault detection if required. For example, consider that a flight is flown across a long power grid corridor, and a video/image is captured by the camera of the power grid, then the image processing system 100 closely monitors for any faults or anomalies across the power grid. The image processing system 100 can detect such anomalies based on certain fault models or reference data pre-loaded in the database. As and when certain characteristics of the pre-loaded match with any detected anomaly, the image processing system 100 classifies them as a fault or an anomaly.

Overall, the image processing system 100 goes through five stages of processing wherein the first stage applies mean shift filtering to find the peak of a confidence map using a color histogram of an image. The second stage generates a gradient image that retains its linear features. In the third stage, a median strip is considered based on the position of the camera and seed point pairs are selected for contour growing based on gradient magnitude and the pixel values as features. The fourth stage pertains to detection of contours of infrastructural linear features in image spaces using the contour growing approach. Finally, false positives using rigidity features are removed, as represented by a total sum of gradient orientations.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for facilitating real time detection of at least one linear infrastructural object by aerial imaging, said method comprising:
   applying, via one or more hardware processors, a background suppression technique to a HSV image, wherein said HSV image is first converted to a grey scale image and a binary image;
   implementing, via the one or more hardware processors, a mean shift filtering technique to find a peak of a confidence map by using a color histogram of said HSV image;
   performing, via the one or more hardware processors, a gradient image generation for a plurality of edges of said HSV image using a sobel function;
   extracting via the one or more hardware processors a seed point pair along a middle cut portion of a linear feature of the HSV image to identify one or more boundaries of the seed point pair;
   initiating via the one or more hardware processors a contour growing approach to detect said one or more boundaries of the linear feature; and
   removing via the one or more hardware processors one or more false positives by using a rigidity feature, the rigidity feature being equivalent to the total sum of gradient orientations.

2. The processor implemented method of claim 1, further comprising constructing a three dimensional feature space to locate a plurality of high fidelity conductors of said at least one infrastructural object.

3. The processor implemented method of claim 1, wherein a plurality of linear features are detected by tracking a boundary of said infrastructural object in linear space, by applying said background suppression technique.

4. The processor implemented method of claim 1, wherein the seed point pair is constructed by using a second set of candidate seed points, by a side-facing camera.

5. The processor implemented method of claim 1, wherein the seed point pair is detected from a bottom horizontal line, by a front facing camera.

6. A system for facilitating real time detection of at least one infrastructural object by aerial imaging, said system comprising:
- a memory storing instructions;
- a hardware processor coupled to said memory, wherein said hardware processor is configured by said instructions to:
  - apply a background suppression technique, wherein a HSV image is first converted to a grey scale image and a binary image;
  - implement a mean shift filtering technique to find a peak of a confidence map by using a color histogram of said HSV image;
  - perform a gradient image generation for a plurality of edges of the HSV image using a sobel function;
  - extract a seed point pair along a middle cut portion of a linear feature of the HSV image to identify one or more boundaries of the seed point pair; and
  - initiate a contour growing approach to detect said one or more boundaries of the linear feature.

7. The system of claim 6, wherein said hardware processor is configured to construct a three dimensional feature space to locate a plurality of high fidelity conductors of said at least one infrastructural object.

8. The system of claim 6, wherein said hardware processor is configured to detect a plurality of linear features by tracking a boundary of said infrastructural object in linear space, by said background suppression technique.

9. The system of claim 6, wherein said hardware processor is configured to construct the seed point pair by using a set of candidate seed points.

10. The system of claim 6, wherein said real time detection of at least one infrastructural object is enabled by using at least one of a front facing camera, a rear facing camera, and a side facing camera.

* * * * *